…

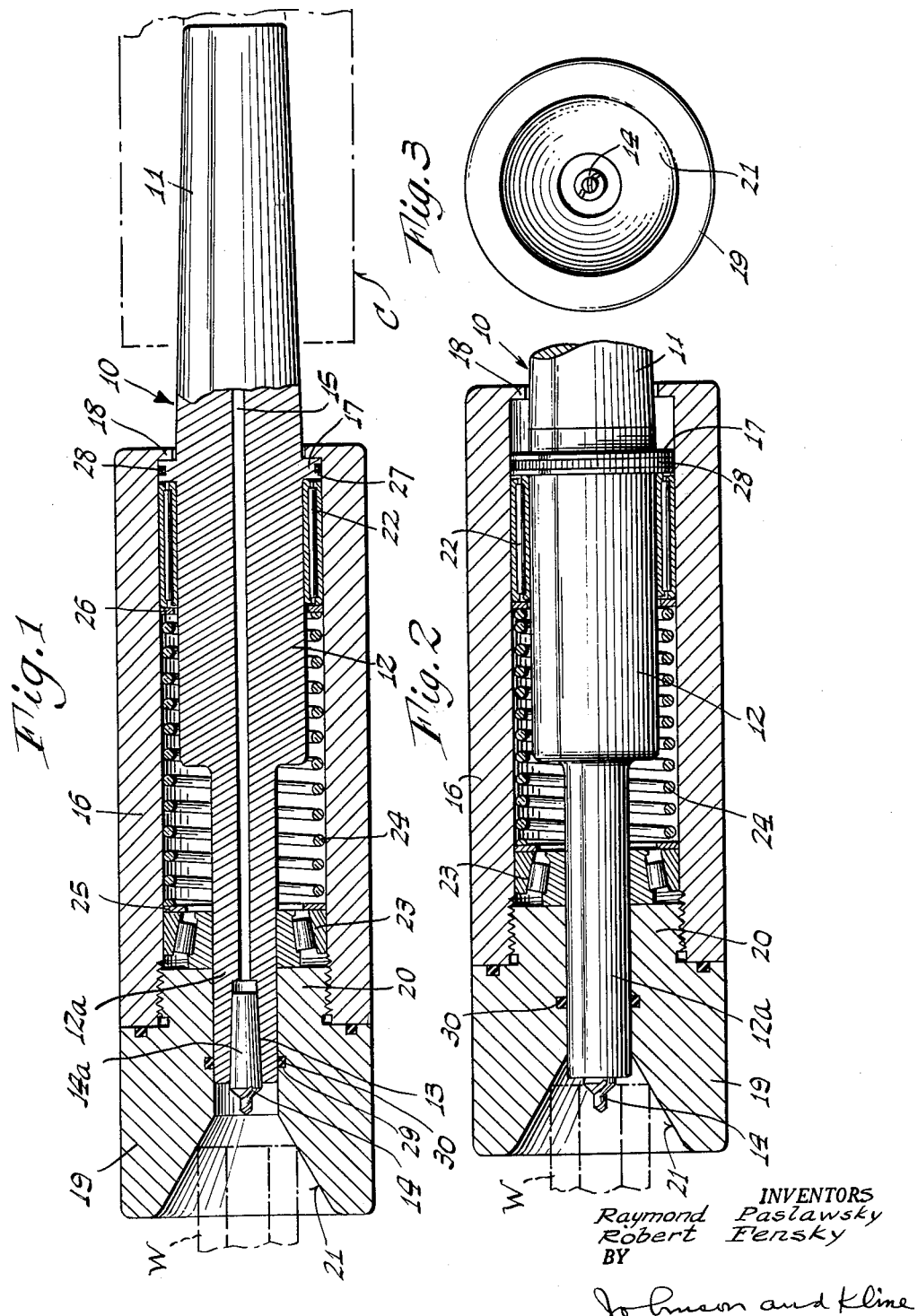

United States Patent Office 3,099,173
Patented July 30, 1963

3,099,173
CENTER HOLE FORMING MEANS
Raymond Paslawsky, 201 Morehouse Highway, and Robert Fensky, 175 Morehouse Highway, both of Fairfield, Conn.
Filed June 7, 1960, Ser. No. 34,455
4 Claims. (Cl. 77—18)

This invention relates to a tool for rapidly and accurately providing center holes in shafts or the like pieces which have to be turned or ground.

It is an object of the invention to provide a device for providing center holes which can be mounted in the tailstock or chuck of a lathe or in a drill press for accurately centering a workpiece with respect to the drill.

It is a further object of the invention to provide a center hole forming device which is of rugged yet simple construction having a minimum number of parts, which is reliable in operation, which can be readily assembled and which is accurate in its operation.

Other features and advantages of the invention will be apparent from the specification and claims when considered in connection with the accompanying drawings in which:

FIGURE 1 shows a side view, partly in section, of the center hole forming device of the present invention.

FIG. 2 is a view, partly in section, showing the parts in hole forming position.

FIG. 3 is an end view of the device.

As shown in the drawings, the device of the present invention comprises a center body 10 having a tapered shank 11 at one end which is adapted to be inserted in the usual center-receiving bore of a tailstock spindle or to be mounted in a chuck of a lathe, drill press or the like as indicated generally at C. The forward part 12 of the center body is cylindrical and is preferably stepped as shown in FIG. 1 so as to have a portion 12a of smaller diameter at the forward end. The body at the forward end has an axial recess 13 to receive a drill 14 so that the drill projects beyond the end of the body. In the illustrated form of the invention, the recess 13 is tapered so as to have a force fit with the tapered shank 14a of the drill and hold it in axial position with respect to the center body. Preferably, the center body has an axial bore 15 communicating with the recess 13 whereby a drive pin (not shown) may be inserted to release the drill from the body.

Surrounding the cylindrical portion of the center body is a sleeve 16. The sleeve is mounted on the center body for axial movement with respect to the body and for rotation about the center body. While this may be accomplished in many ways, it has been found desirable to mount the sleeve for rotation by means of antifriction bearings and to provide means for limiting it in a projected position to which it is urged.

As shown in the drawings, the center body has a radial flange 17 disposed between the cylindrical portion 12 and the tapered portion 11. The periphery of the flange engages the inner surface of the sleeve and the sleeve has an inturned flange 18 adapted to abut the radial flange 17 and cooperate therewith to limit the movement of the sleeve forwardly of the device. The forward end of the sleeve is provided with a cap portion 19 which is provided with a neck 20 adapted to be threaded into the inner end of the sleeve so as to be secured thereto for rotation therewith and is slidably mounted on the cylindrical portion 12a of the body. The end cap is provided with a frusto conical recess 21 which is axially aligned with the body and the tool carried thereby and which functions to accurately center the end of any workpiece W, which is inserted therein, with the tool.

The sleeve is mounted for free rotation on the body by means of antifriction bearings. Preferably, as shown in FIG. 1, a needle bearing 22 surrounds the larger stepped portion of the cylindrical portion of the body and abuts the radial flange 17 and supports the rear end of the sleeve while a thrust bearing 23 is slidably mounted on the portion 12a of the body and abuts the end of the neck 20 and supports the forward end of the sleeve. A spring 24 surrounds the cylindrical body and bears against washers 25, 26 overlying the ends of the thrust bearing and the needle bearing and maintains the sleeve in projected position, as shown in FIG. 1, in which position the workpiece can be first positioned in the frusto conical recess and automatically centered with respect to the drill so that, upon pressure being applied to the drill or to the sleeve relative axial movement between the sleeve and drill will result causing the workpiece to be moved into engagement with the drill and the center hole automatically drilled.

The workpiece may be rotated and the drill held stationary as in the case of a lathe, or the work may be stationary and the drill rotated as in the case where the device is used in a drill press. In each instance the device will accurately drill the center hole in the end of the workpiece.

In order to seal the device against influx of dirt and the like particles which might damage the bearings and interfere with the relative sliding movement of the sleeve and center body, seals have been provided. While these may take many forms, in the illustrated form of the invention one seal is provided by forming a peripheral groove 27 in the radial flange 17 and positioning an O-ring 28 in the groove to engage it in the inner surface of the sleeve, and another seal is formed at the end cap by providing the cap with a groove 29 in the bore of the neck in which an elastic O-ring 30 is inserted to sealingly engage the surface of the cylindrical portion 12a. The two O-ring seals produce an effective seal for the unit.

A feature of the invention resides in the simplicity of the device since it consists of three machined parts and a pair of prefabricated bearings, a spring and two washers. It can be readily assembled by assembling the bearings and spring on the center body, inserting the sleeve over the assembly, and threading the end cap into position.

By the construction of the present device, a relatively inexpensive center hole forming unit is provided which is fully balanced in its operation and provides a smooth and effective operating device.

Variations and modifications may be made within the scope of the claims and portions of the improvements may be used without others.

We claim:

1. A center hole drilling device comprising a center body having a tapered shank at the rear end and a center bore therethrough provided with a tapered portion at the forward end to receive with a force fit the tapered shank of a drill, said body having a cylindrical portion slidably receiving sleeve means surrounding the body and having an end portion provided with a frusto conical centering recess in the end coaxially disposed with respect to said drill whereby the end of a workpiece inserted in said recess is automatically centered with respect to said drill, said sleeve means being rotatably mounted on the cylindrical portion of the body by antifriction bearings and being urged to a projected position by means of a spring, said spring yielding to permit relative axial movement between the sleeve and drill whereby the drill is moved into engagement with the centered workpiece to from the center hole therein.

2. A center hole drilling device comprising a center body having a tapered shank at the rear end and a center bore to mount a drill at the forward end with the end of the drill projecting beyond the end of the body, said body having a stepped cylindrical portion forwardly of the tapered shank, a rotatable sleeve slidably mounted on the cylindrical portion for relative axial movement and having a flange at the rear cooperating with the body to limit forward sliding movement of the sleeve, said sleeve having an end cap connected thereto at the forward end for rotation therewith and provided with a neck rearwardly extending into the sleeve and slidable on the smaller of the stepped cylindrical portions surrounding the drill bit, said end cap having a frusto conical centering recess in the front and coaxially disposed with respect to said drill whereby the end of a workpiece inserted in said recess is automatically centered with respect to said drill, and spring means entirely enclosed within said slidable sleeve normally urging said sleeve to a projected position, said spring means yielding to permit relative axial movement between the sleeve and drill whereby the drill is moved into engagement with the center workpiece to form the center hole therein.

3. A center hole drilling device comprising a center body having a tapered shank at the rear end and a center bore therethrough provided with a tapered portion at the forward end to receive with a force fit the tapered shank of a drill, said body having a radial flange between the tapered shank and a stepped cylindrical portion, a sleeve slidably mounted on the cylindrical portion with the rear end extending past the racial flange and having an inturned flange engaging the radial flange to limit forward sliding movement of the sleeve, said sleeve having an end cap provided with a neck rearwardly extending into the sleeve and slidable on the smaller of the stepped cylindrical portions, said end cap having a frusto conical centering recess in the front end coaxially disposed with respect to said drill whereby the end of a workpiece inserted in said recess is automatically centered with respect to said drill, means rotatably mounting said slidable sleeve on the cylindrical portion comprising an elongate needle bearing between the sleeve and larger of the stepped cylindrical portions and abutting the radial flange and a thrust bearing abutting the end of the neck and disposed between the sleeve and smaller of the stepped portions, and spring means disposed between said bearings and urging said sleeve to a projected position, said spring means yielding to permit relative axial movement between the sleeve and drill whereby the drill is moved into engagement with the centered workpiece to form the center hole therein.

4. A center hole drilling device comprising a center body having a tapered shank at the rear end and a stepped cylindrical portion at the forward end, a drill axially mounted in the body to project beyond the forward end, said body having a radial flange between the tapered shank and the stepped cylindrical portion, a sleeve slidably mounted on the cylindrical portion with the rear end extending past the radial flange and having an inturned flange engaging the radial flange to limit forward sliding movement of the sleeve, said sleeve having an end cap provided with a neck threaded into the forward end of the sleeve and slidable on the smaller of the stepped cylindrical portions, said end cap having a frusto conical centering recess in the front end coaxially disposed with respect to said drill whereby the end of a workpiece inserted in said recess is automatically centered with respect to said drill, means rotatably mounting said slidable sleeve on the cylindrical portion, spring means urging said sleeve to a projected position, said spring means being entirely enclosed within the sleeve and yielding to permit relative axial movement between the sleeve and drill whereby the drill is moved into engagement with the centered workpiece to form the center hole therein, and means sealing the sleeve to the body comprising a resilient O-ring positioned in a peripheral groove in the radial flange to engage the sleeve and a resilient O-ring in the neck engaging the smaller of the stepped cylindrical portions whereby foreign material is prevented from entering within the sleeve.

References Cited in the file of this patent

UNITED STATES PATENTS

| | | |
|---|---|---|
| 100,772 | Kelly | Mar. 15, 1870 |
| 347,925 | Deno et al. | Aug. 24, 1886 |
| 521,206 | Covel | June 12, 1894 |
| 592,912 | Johnson | Nov. 2, 1897 |
| 757,950 | McElwain et al. | Apr. 19, 1904 |

FOREIGN PATENTS

| | | |
|---|---|---|
| 138,895 | Australia | Feb. 24, 1949 |